Patented June 2, 1936

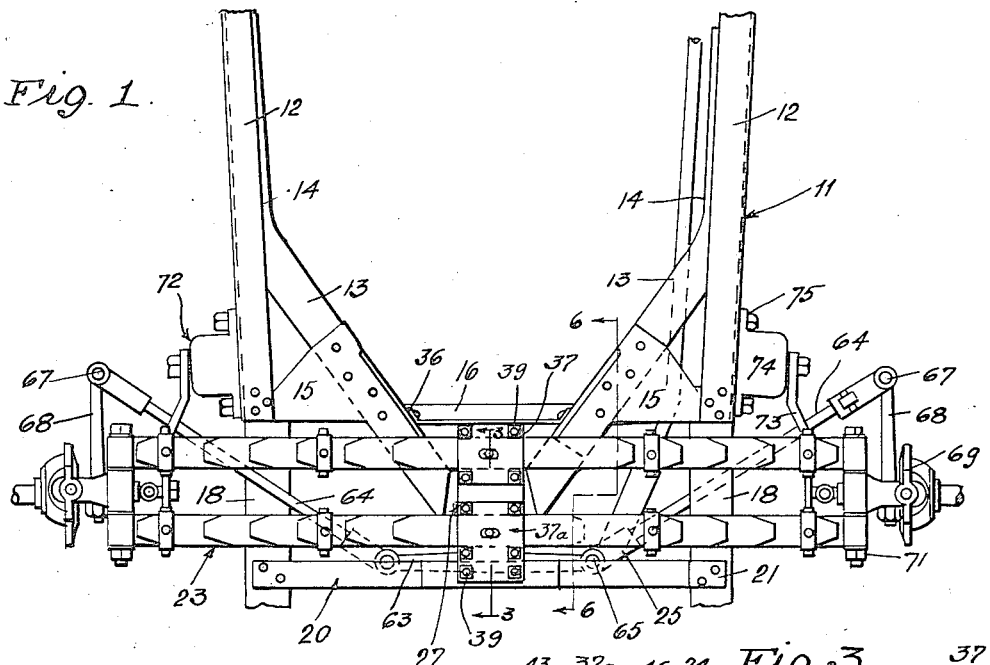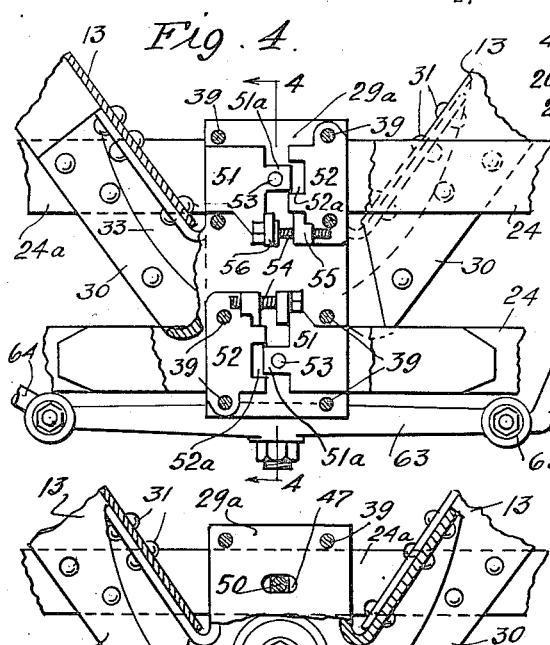

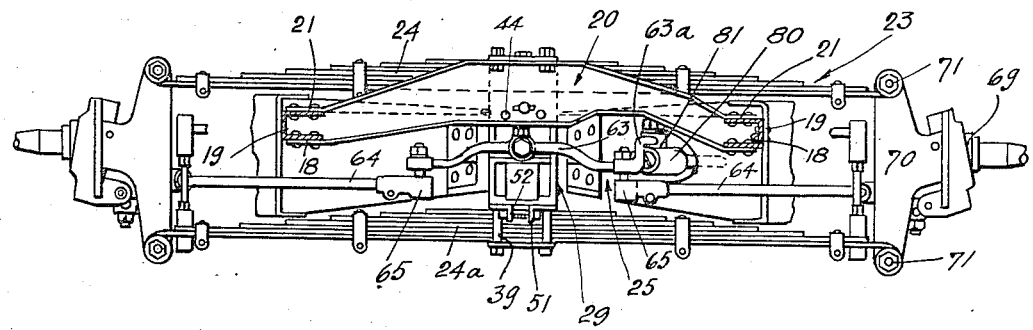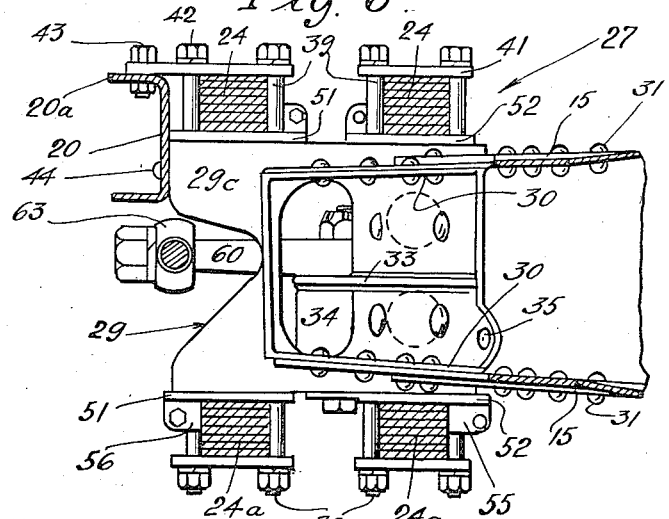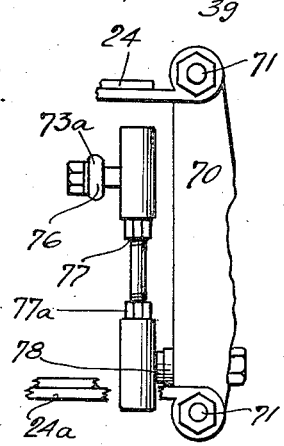

2,042,853

UNITED STATES PATENT OFFICE 2,042,853

AUTOMOBILE SPRING MOUNTING

Oscar F. Lundelius and Melvin N. Lefler, Los Angeles, Calif., assignors to Lundelius & Eccleston Motors Corporation, Los Angeles, Calif., a corporation of Delaware Original application August 7, 1933, Serial No. 683,928. Divided and this application January 26, 1934, Serial No. 708,390

15 Claims. (Cl. 267—38)

This invention is principally concerned with improvements in vehicle spring mountings and in spring adjusting means operable to shift the springs longitudinally, the invention in certain of its phases being particularly applicable to automobile chassis in which the frame is connected with wheels by way of transverse spring assemblies. In other of its aspects, the invention deals with variations in the type of spring mounting and spring adjustment shown and broadly claimed in our copending application on Vehicle spring mounting, Ser. No. 683,927, filed August 7, 1933. The present application is a division of our copending application Ser. No. 683,928, filed August 7, 1933 on Vehicle chassis—Front end construction.

The invention and its various features and objects will perhaps be understood most readily and explained to best advantage without the necessity for further preliminary comment, from the description to follow. Throughout the description, reference is had to the accompanying drawings, in which:

Figure 1 is a plan view showing a typical front end chassis construction embodying the invention;

Fig. 2 is a front elevation of Fig. 1;

Fig. 3 is an enlarged section on line 3—3 of Fig. 1;

Figs. 4 and 5 are sectional views looking down on lines 4—4 and 5—5, respectively, of Fig. 3, certain of the parts being broken away to more clearly show the construction;

Fig. 6 is an enlarged section on broken line 6—6 of Fig. 1; and

Fig. 7 is a fragmentary enlargement of the snubber linkage connected with the wheel carrier.

As best shown in Fig. 1, the frame 11 of the chassis comprises a pair of channel-shaped side rails 12, of which the forward portions only are shown. A pair of channel-section frame members 13 connect with the side rails at points 14 spaced rearwardly of the frame from the forward ends of the side rails. Members 13 converge toward the front of the frame and are interconnected at their forward ends as will hereinafter appear. Side rails 12 are connected with convergent members 13 by means of plates 15 riveted to the members as indicated. We preferably interconnect the convergent members 13 by a transverse brace 16 spaced a suitable distance from the ends of the members. Longitudinally extending rails 18 are connected at 19, see Fig. 2, with the side rails 12 and project forwardly to form extensions thereof. A front and transverse frame member 20, shaped as most clearly illustrated in Fig. 2, connects at 21 with members 18, the transverse member 20 being vertically offset to connect with the spring mounting parts, hereinafter described, and to provide clearance beneath for the steering gear parts.

A transversely extending spring assembly, generally indicated at 23, is mounted on convergent members 13, the spring assembly being typically illustrated as comprising two pairs of vertically spaced springs 24 and 24a, although it will be understood that the springs may be of any suitable number and arrangement. Members 13 serve also to support parts of the steering gear, generally denoted at 25, the details of which are fully described in the patent to Lundelius et al., referred to hereinabove. The arrangement of the frame parts, and especially convergent members 13, renders the frame particularly suited to the mounting of the spring assembly and steering gear parts in the positions illustrated, and extremely strong to resist shock and impact stresses transmitted by way of the springs and their mounting. Stresses applied longitudinally to the frame through the spring mounting are taken directly to members 13, and through them transmitted to side rails 12, members 15 serving to give added strength both as against longitudinal and transverse stresses.

While in the broad aspects of the invention, convergent members 13 may be interconnected at their forward ends and the spring assembly mounted thereon in any suitable manner, we preferably provide a separately constructed spring mounting, generally indicated at 27, interposed between and interconnecting the convergent ends of members 13 as best illustrated in Figs. 3 to 6. Mounting 27 comprises a rectangularly tubular structure 29 having top and bottom walls 29a, 29b, and side walls 29c, the front and rear ends of the box being open. Diverging channel-shaped arms 30 are formed integrally with the side walls 29c of the box and project within and in overlapping relation with the forward ends of frame members 13, the parts being connected by rivets 31. The mounting is reenforced by a horizontally extending rib 33 formed integrally with arm portions 30 and the upper end of tubular housing 34 for the steering arm spindle, later described. The rear ends of arms 30 may also be connected through members 13 with transverse member 16, holes 35 in the rear ends of web portions 30a of the arms receiving rivets or bolts 36 which connect the transverse member 16 with members 13.

Upper and lower pairs of springs 24 and 24a are attached to the top and bottom surfaces of box mounting 29 by means of center clamps 37, 37a and 38. The invention broadly contemplates the use of any suitable type of connection or mounting for attaching the springs to convergent frame members 13, although the herein illustrated type of adjustable center clamp may be regarded as preferred. Each of the center clamps comprises two pairs of stud bolts 39 threaded into bosses 40 in the top and bottom walls of the box mounting, the spacing of the pairs of bolts at opposite sides of the spring being substantially equal to the width of the spring so that the bolts confine the spring against lateral displacement. The centers of the springs are clamped by strap plates 41 through which bolts 39 extend and which are brought to bear against the springs by nuts 42 on the bolts. As shown most clearly in Fig. 3, plate 41a of the forward upper clamp 37a is attached by bolts 43 to top flange 20a of the transverse frame member 20, the forward end of box 29 also being attached to this frame member by rivets 44 passing through lugs 45 projecting inwardly from the side walls of the box. Openings 46 and 47 are provided in strap plates 41, and in top and bottom walls 29a, 29b of the box structure to receive nuts 48 and heads 49 of the spring center bolts 50, openings 46 and 47 being in the form of slots extending longitudinally of the springs.

Because of variations in the lengths of different springs or because of longitudinal dimensional inaccuracies in individual springs, it may become necessary to adjust or shift one or more of the springs longitudinally to compensate for such inaccuracies. For this purpose we have included in the spring mounting, means whereby the springs may be shifted longitudinally to adjusted position and thereafter held securely against movement from such position.

The adjustment parts for each spring being similar, a description of one will suffice for all. Our preferred form of spring adjusting means comprises a pair of plates 51 and 52, see Fig. 4, placed between the springs and the top and bottom surfaces of the box mounting 29. Bolts 39 pass through openings in plate 52 to hold the latter against movement both transversely and longitudinally of surface 29a of the box. Plate 51, however, though confined by the bolts 39 against substantial movement longitudinally on surface 29a, may be moved transversely thereof, toward or away from plate 52. The latter has a recess 52a within which tongue 51a of plate 51 projects, and the tongue has a central opening 53 through which head 49 of the spring center bolt extends. Movement of plate 51 toward or away from plate 52 is accomplished by adjusting screw 54 threaded through lugs 55 and 56 formed integrally with the plates and offset to one side of the spring.

It will be seen that by reason of the spring center bolt head being confined within opening 53 of the adjusting plate, movement of the latter by operation of screw 54 will result in longitudinal shifting of the spring. In order to adjust the spring, assuming the latter to be clamped within its center mounting, nuts 42 first are loosened to release the spring for longitudinal movement. Then by turning screw 54, plate 51 is caused to move and shift the spring longitudinally to adjusted position in the manner hereinabove described, slots 46 and 47 having sufficient extent to permit movement therein of the nut and head of the spring center bolt within the desired range of adjustment. After the spring has been shifted to its adjusted position, nuts 42 may then be tightened to securely clamp and hold the spring against further longitudinal movement.

As previously mentioned, the box structure 29 serves also as a mounting for parts of the steering gear 25. Referring to Fig. 3, the steering gear parts directly mounted on the box 29, comprise a movable T-shaped steering element which includes a horizontally swinging arm 60 carried on spindle 61 journalled in bearings 62 within a housing 34. Arm 60 carries cross piece or head 63 to the ends of which tie rods 64 are connected by universal joints 65, the tie rods extending diagonally between the springs. Side walls 29c of the box 29 are recessed at 66 to permit the T-shaped steering arm to swing within its full range of movement. The outer ends of tie rods 64 connect through universal joints 67 with steering knuckle arm 68 of the wheels 69. The wheels are joined to wheel carriers 70 to which the ends of the springs are pivotally connected at 71, the wheel carriers being vertically movable with the wheels as the latter are deflected vertically upon encountering road irregularities.

Head 63 of the steering arm carries an extension 63a, see Fig. 2, to which a drag link 80 is pivotally connected at 81. By longitudinal movement of the drag link through usual connections with the steering wheel not shown the T-shaped steering arm is actuated to impart, through the tie rods, steering movement to the wheels.

Excessive deflection of the springs as a result of extreme vertical displacement of the wheels when abnormal road irregularities are encountered, is resisted by snubbing devices, generally indicated at 72, which preferably connect directly with the wheel carriers. Each of the snubbers 72 comprises a forwardly extending and vertically oscillatory arm 73 connecting with a spring or hydraulic type snubber body or box 74 bolted at 75 to side rails 12 of the frame. Any one of a variety of known forms of snubber boxes may be readily adapted to our purpose, as will be recognized by those familiar with the art. The forward end 73a, see Fig. 7, of snubber arm 73 is pivotally connected at 76 with an adjustable linkage 77 attached to the wheel carrier 70 by a pivotal joint at 78 which will allow oscillatory movement of the linkage 77 in conformity with the arc described by the forward end of arm 73 as the springs flex.

We claim:

1. In a vehicle of the character described, a longitudinally adjustable spring, a spring mounting comprising a stationary spring support, an adjustment plate between said support and the spring and movable with the spring as the latter is shifted longitudinally, a spring bolt engaging said adjustment plate, means for moving said plate to shift the spring longitudinally, and a clamp for holding said spring in adjusted position and having an opening receiving said bolt, said plate being movable relative to the clamp.

2. In a vehicle of the character described, a transverse spring, a spring mounting comprising a stationary support, a movable spring adjusting member in the form of a flat plate placed between the spring and said support, the spring resting flatly on said plate and said spring being shiftable longitudinally by moving the adjusting member, and means for moving said member, said means comprising an adjustable screw carried on said plate at one side of the spring, and a stationary member engaged by said screw.

3. In a vehicle of the character described, an elongated leaf spring adjustable longitudinally, and spring adjusting means comprising a pair of members each engaging the spring and relatively movable longitudinally of the spring, and means interengaging the spring and one of said members.

4. In a vehicle of the character described, an elongated leaf spring adjustable longitudinally, and spring adjusting means comprising a pair of plates each bearing flatly against the spring and relatively movable longitudinally of the spring, means interengaging the spring and one of said plates, and means for adjustably shifting the last mentioned plate and the spring.

5. In a vehicle of the character described, an elongated leaf spring adjustable longitudinally, and spring adjusting means comprising a pair of plates supporting the spring at points spaced longitudinally thereof and relatively movable longitudinally of the spring, means interengaging the spring and one of said plates, and means for adjustably shifting the last mentioned plate and the spring, said means comprising an adjustment screw carried on one of said plates and engaging the other plate.

6. In a vehicle of the character described, an elongated leaf spring adjustable longitudinally, and spring adjusting means comprising a pair of plates supporting the spring at points spaced longitudinally thereof and relatively movable longitudinally of the spring, means interengaging the spring and one of said plates, means holding the other plate against movement longitudinally of the spring, and means for adjustably shifting the first mentioned plate in the longitudinal direction of the spring.

7. In a vehicle of the character described, a longitudinally adjustable spring, a spring mounting comprising a stationary spring support, an adjustment member movable with the spring to shift the latter longitudinally and projecting beyond one side of the spring, and an adjustment connected to said member and positioned at said side of the spring, said member being movable by means of said adjustment to shift the spring.

8. In a vehicle of the character described, a longitudinally adjustable spring, a spring mounting comprising a stationary spring support, an adjustment member movable with the spring to shift it longitudinally, means for adjustably moving said member to shift the spring, a clamp pressing the spring against said member and holding the spring against longitudinal movement, the clamp being releasable to permit operation of said adjusting means and remaining in predetermined position longitudinally of the spring, independently of movement of said member, and said clamp and member being located at substantially the same point longitudinally of the spring and at opposite sides thereof.

9. In a vehicle of the character described, a longitudinally adjustable spring, a spring mounting comprising a stationary spring support, an adjustment member connected to and projecting beyond one side of the spring and movable with the spring to shift the latter longitudinally, and an adjustment connected to said member and positioned at said side of the spring, said member being movable by means of said adjustment to shift the spring.

10. In a vehicle of the character described, a longitudinally adjustable spring, a spring mounting comprising a stationary spring support, an adjustment member between said support and the spring, said member being connected to and projecting beyond one side of the spring and being movable with the spring to shift it longitudinally, and adjustable spring shifting means offset to said side of the spring and connected to said member.

11. In a vehicle of the character described, a spring, a spring mounting comprising a stationary support, a movable spring adjusting member between the spring and said support and projecting beyond one side of the spring, said spring being shiftable longitudinally by moving the adjusting member, means offset to said side of the spring and adjustable to move said member to shift the spring, and a clamp engaging said spring to hold it in fixed position, said clamp being releasable to permit shifting of the spring.

12. In a vehicle of the character described, a spring, a spring mounting comprising a stationary support, a movable spring adjusting member placed between the spring and said support and having an opening receiving a spring center bolt, said member projecting beyond one side of the spring and the latter being shiftable longitudinally by moving the adjusting member, and means for moving said member.

13. In a vehicle of the character described, a longitudinally adjustable spring, a flat movable spring adjusting member bearing against and movable with the spring, means offset to one side of the spring for moving said member to shift the spring longitudinally, and a releasable spring clamp acting to hold the spring against longitudinal movement and pressing the spring flatly against said member, the clamp and said member being relatively movable longitudinally of the spring.

14. In a vehicle of the character described, a frame, a spring, means for mounting said spring on said frame, said mounting comprising a movable spring adjusting member bearing against the bottom of the spring, means offset to one side of the spring for moving said member to shift the spring longitudinally, and a releasable spring clamp bearing against the top of the spring directly above said member.

15. In a vehicle of the character described, a longitudinally adjustable spring, a spring mounting comprising a stationary spring support, an adjustment member between said support and the bottom surface of the spring and movable with the spring as the latter is shifted longitudinally, said member projecting beyond the side of the spring, means interengaging said spring and adjustment member, adjustable means for moving said member to shift the spring longitudinally, and a spring clamp engaging the top surface of the spring directly above said member, the latter being movable relative to said clamp so that the clamp position is independent of the position of said member.

OSCAR F. LUNDELIUS.
MELVIN N. LEFLER.